United States Patent [19]

Wilson

[11] Patent Number: 4,668,103
[45] Date of Patent: * May 26, 1987

[54] POLYGRAPHIC ENCRYPTION-DECRYPTION COMMUNICATIONS SYSTEM

[76] Inventor: William J. Wilson, 1239 Blevins Gap Rd., Huntsville, Ala. 35802

[*] Notice: The portion of the term of this patent subsequent to May 28, 2002 has been disclaimed.

[21] Appl. No.: 642,874

[22] Filed: Aug. 20, 1984

Related U.S. Application Data

[63] Continuation-in-part of Ser. No. 373,341, Apr. 20, 1982.

[51] Int. Cl.⁴ .............................................. H04K 1/00
[52] U.S. Cl. ...................................... 380/30; 380/44; 380/50; 380/37
[58] Field of Search ............... 178/22.11, 22.14, 22.19, 178/22.05

[56] References Cited

U.S. PATENT DOCUMENTS

| | | | |
|---|---|---|---|
| Re. 30,957 | 6/1982 | Feistel | 178/22.19 |
| 4,200,770 | 4/1980 | Hellman et al. | 178/22.11 |
| 4,218,582 | 8/1980 | Hellman et al. | 178/22.11 |
| 4,351,982 | 9/1982 | Miller et al. | 178/22.11 |
| 4,370,519 | 1/1983 | McArdle | 178/22.14 |
| 4,405,829 | 9/1983 | Rivest et al. | 178/22.11 |
| 4,408,093 | 10/1983 | Place | 178/22.19 |
| 4,471,164 | 9/1984 | Henry | 178/22.11 |
| 4,520,232 | 5/1985 | Wilson | 178/22.05 |

OTHER PUBLICATIONS

"New Directions in Cryptography", by Diffie et al., pp. 644–654, IEEE Transactions on Information Theory, vol. #22, #6, 11/76.

Primary Examiner—Salvatore Cangialosi
Assistant Examiner—Aaron J. Lewis
Attorney, Agent, or Firm—C. A. Phillips

[57] ABSTRACT

A public-key system for encoding, or encrypting, digital data wherein at least two singular matrices of binary bits provide separate encrypting factors. Each matrix is a product of a common singular matrix and a differing non-singular matrix. These encrypting matrices are loaded in separate memory formats. A Vernam or one-time key consisting of blocks or sets of randomly-generated binary bits are loaded into an input shift register, and the state of each stage is coupled as an enabling signal to gates which read out rows of each of the two stored matrices. Groups of outputs from gates serving each of the matrices are combined via column arranged, exclusively-OR gates fed, in parallel, to a shift register. The output of one shift register forms an encrypted decrypting signal. The output of the other shift register is exclusively-ORred in the manner of a one-time key with the binary encoded plaintext to be encrypted. As thus encrypted, it is transmitted with the decrypting signal to the addresses. There, the decrypting signal is transformed by appropriate private-key inverses of the invertible matrix component of the encrypting signal, and then, as modified, it is exclusively-ORred with the text encrypted signal whereby the text is decrypted.

7 Claims, 4 Drawing Figures

FIG. 4

POLYGRAPHIC ENCRYPTION-DECRYPTION COMMUNICATIONS SYSTEM

This is a continuation-in-part of application Ser. No. 373,341 entitled "polygraphic Encryption-Decryption System," filed Apr. 20, 1982.

TECHNICAL FIELD

This invention relates generally to electronic systems for encrypting binary values or states, and particularly to a system of this character wherein a number of binary characters are to be encrypted as a set or block, such system of encrypting being often referred to as polygraphic or block encryption systems. It envisions both private- and public-key systems with unique one-time key capabilities and strength.

BACKGROUND ART

There are many instances in the processing and transmission of binary data where it is desirable to translate a series or block of discrete binary bits of data into a like numbered block or series of bits, but wherein at least certain of the binary states of the series must be translated to an opposite state in accordance with some reversible pattern of translation. In the past, block, or polygraphic encryption, has been unduly complex, it has required a significant number of electronic operations, and has been both slow and costly as well as fixed and limited in key size (or spaces) and security. As a result, although it is a quite desirable type of encryption, it has not been widely used.

It is an object of this invention to provide both private-key and public-key polygraphic or block system of binary data encryption and decryption which is both fast and inexpensive and at the same time provides significantly enhanced security over known polygraphic and block encryption systems as a result of its incorporation of one-time key capabilities.

SUMMARY OF THE INVENTION

In accordance with this invention, an electronic memory is loaded with a binary matrix of "0" or "1" signal states, and the rows and columns of the matrix are made up so that the matrix is an invertible matrix. This thus loaded memory becomes an encryption (or decryption) instrument or key. Binary data to be encrypted is fed to a temporary or buffer input memory which holds a set of binary bits to be encrypted, this memory having an equivalent number of bit holding stages to the square, row or column, size of the binary matrix loaded memory. The bit state of each location of the input memory is employed as an enable circuit which, corresponding to a pre-selected state, a 0 or 1, causes the binary states of row loadings of the matrix memory to be read out. Outputs of column loadings of the matrix memory so read out are fed to discrete exclusively OR gates (there being one for each column) which have outputs connected to discretely ordered stages of a buffer output memory. Since only those rows which are subject to an enabling binary state from the input memory provide outputs to the exclusively OR gates, the output memory is encrypted by an input memory determined selection of a combination of binary states derived from the matrix. The now encoded contents of the output memory are serially read out and may then be transmitted over an insecure communications channel to a receiving point where the encoded binary bits would be decrypted. Decryption is accomplished in the same manner as encryption, with the exception that the decryption matrix is the inverse of the encryption matrix. It is to be appreciated that the "row" and "column" terms as used herein may be reversed.

The foregoing describes basically a private-key system wherein it is necessary to keep secret both the encrypting and decrypting matrices.

In the application of the present invention to public-key systems, the contents of one of two output memories would produce an encrypting signal in the classic manner of a one-time key rather than an encrypted signal. In such case, there would have been loaded into the first input memory a singular matrix SX (representing the product of a specially-created singlular matrix S and non-singular matrix X). The output of the first matrix forms an encrypting signal which is applied to the binary state plain-text to be encrypted. The second memory would have been loaded with singular matrix SY (representing the product of singular matrix S and non-singular matrix Y). The output of this memory constitutes an encrypted form of the above-mentioned encrypting signal (one-time key) which can be recovered only by the private-key. Thus, we see that two singular matrices are employed to create two related cryptic signals. One is actually used as a one-time key in the encryption of plaintext, and the other (the encrypted form of the one-time key) is transmitted along with the encrypted signal to an addressee to assist in decryption. The two singular matrices are published or otherwise known; only the random sequence is not published.

Decryption by the addressee is effected by the same system as encryption employing a private, secret, key for a single matrix (where only a single channel of text is encrypted), this matrix being mathematically related to the two matrices employed in the encryption. The relation is that the two encryption matrices are at least the product of a common singular matrix S and different non-singular matrices X and Y, whereas the decryption matrix $Y^{-1}X$ is the product of the inverse of one of the non-singular matrices and the other matrix.

DETAILED DESCRIPTION OF THE DRAWINGS

Figure 1:
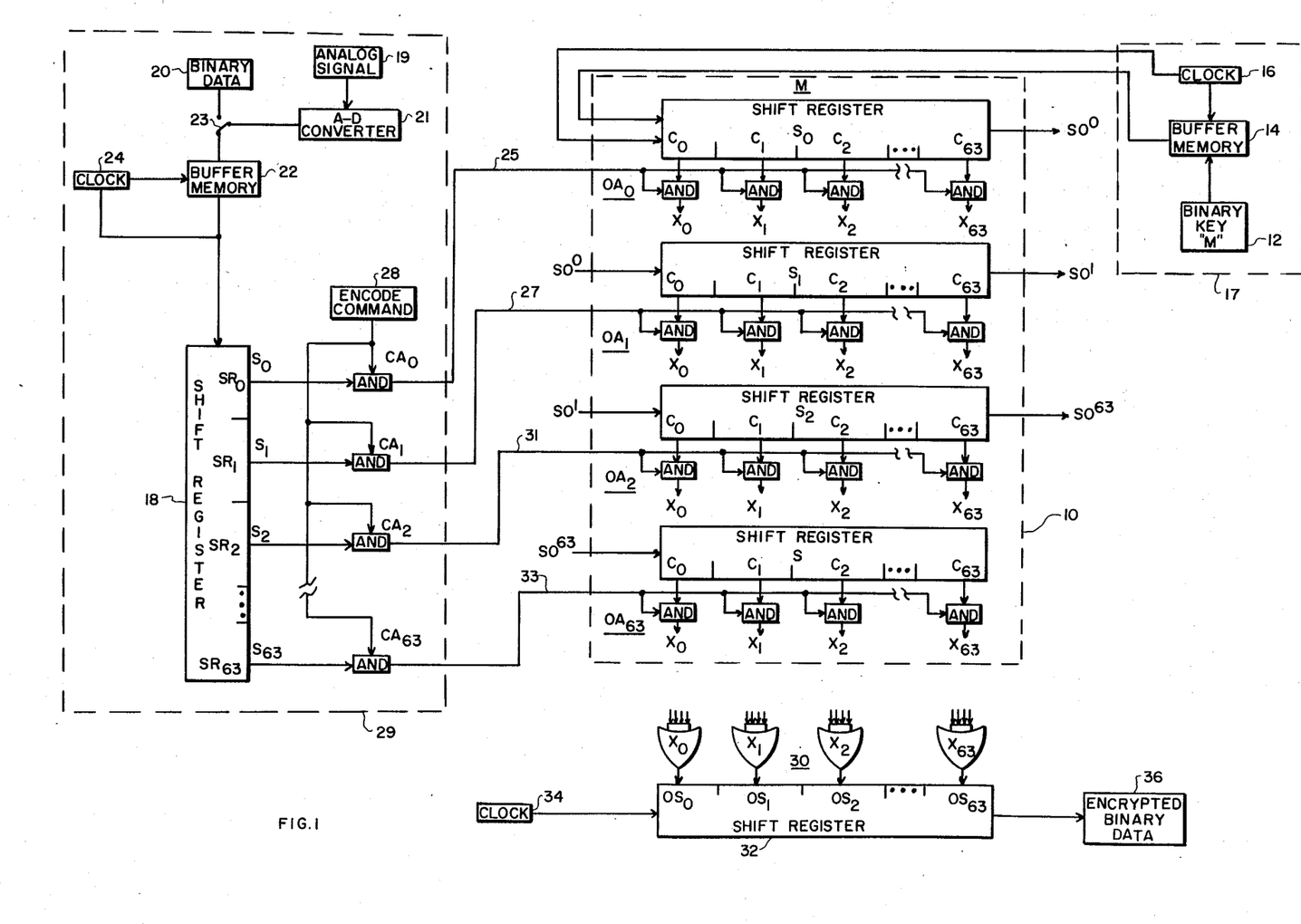
FIG. 1 is an electrical schematic block diagram of an embodiment of the invention as applied to a private key system.

Referring to the drawings, and initially to FIG. 1, a central memory 10 is provided in which is stored an encryption, or decryption, key in the form of a binary matrix. Significantly, no row of the matrix can be all zeroes, and the modulo 2 sum of any combination of rows cannot be equal to the binary number representative of any row. The same is true for columns. With these conditions met, the matrix has the characteristic of being invertible, or non-singular, a feature of this invention. In accordance with a matrix key, memory or matrix register 10 is illustrated as being composed of shift registers wherein each shift register forms a row of a matrix, and like ordered stages of these shift registers may also be treated as columns of the matrix. As an example which produces an essentially unbreakable encryption, the matrix employed is a 64×64 bit binary matrix (a smaller number or larger number may be used, depending upon the degree of security desired), and, coordinately, memory 10 is formed of 64 shift registers $SO_0$–$SO_{63}$ for rows, and wherein each register has 64 binary signal storage stages or locations. Like ordered stages of the shift registers are deemed column locations of the matrix and are appropriately designated as $C_0$–$C_{63}$.

An invertible binary matrix key M, represented by the numeral 12, would be generated and recorded, as on a magnetic disk. Then, it would be loaded through an appropriate interface, such as buffer memory 14 and a clock source 16, into the shift registers of memory 10, elements 12, 14, and 16 being representative of a serial bit source 17. For convenience of loading, typically the shift registers would be serially arranged to permit serial loading as by the interconnection of the last stage of each shift register to the first stage of the following shift register, this being illustrated by lead lines $SO_1$, $SO_2$, and $SO_{63}$.

Binary data is encrypted in succeeding blocks or sets of 64 binary bits, corresponding to the rank order of the binary matrix M. The bits are loaded into 64 bit input shift register 18 from some conventional source 20 of binary data, such as an electronic keyboard, computer, or memory. Alternately, the binary data would be derived from an analog data source 19, e.g., telemetry or speech, in which case the analog data would be converted to digital data by analog-to-digital (A-D) converter 21. Then, typically, the data would be fed from either binary data source 20 or A-D converter 21 through selector switch 23 to a buffer memory 22 and then be clocked into input shift register 18 by the introduction of clock pulses from clock pulse generator 24 to buffer memory 22 and to input shift register 18. When loaded, set outputs of shift register 18, labeled $S_0$–$S_{63}$ for the responsive stages of the shift register, would present "0" or "1" electrical outputs indicative of the binary state of each particular stage. Thus, there would appear 64 signal states, some of which would typically be a "0" state and some a "1" state. Conventional means would be provided to ensure that each set of data supplied to input shift register 18 is complete and that the ordered position of each bit is accomplished. This is typically accomplished by means of parity checks or cyclic redundancy codes and by the use of counting devices, such as ring counters.

Each numbered 'set' output of shift register 18 is employed such that when its output is a "1," it causes all stage set outputs of a discrete shift register of memory 10 to be provided as outputs. Thus, when there is a "1" state in the first or $SR_0$ stage of input shift register 18, the outputs of stages of a corresponding shift register of memory 10 are read out, and so on.

As a means of accomplishing readout of memory 10, the set output of each register of input shift register 18 is first fed to an input of a separate and discrete control AND gate of AND gates $CA_0$–$CA_{63}$. These AND gates are all enabled at the same time by a command logic signal from encode command control 18. When this occurs, the shift register outputs of shift register 18 are gated via control leads 25, 27, 31 and 33 to the enable inputs of the AND gates of memory 10 which control the readout of discrete stages of the shift registers of memory 10. The input circuitry consisting of elements 18–28 and $CA_0$–$CA_{63}$ are representative of data source 29. There is one of these AND gates $CA_0$–$CA_{63}$ for each shift register, and, accordingly, each set is labeled with one of the designation $OA_0$–$OA_{63}$.

It will be noted that the state output of a discrete stage of shift register 18 is employed to enable the AND gates of one of the AND gate sets $OA_0$–$OA_{63}$ bearing a like number to the shift register stage number of shift register 18. In this fashion, the state of a stage of shift register 18 gates out the output of one of shift registers $SO_0$–$SO_{63}$ of memory 10 when the state of that stage is of a selected or gating state, for example, a "1" state. In this manner, one row of the matrix of memory 10 appears as outputs $X_0$–$X_{63}$ of the AND gates. In instances where the state or stage of shift register 18 is a "0," then the corresponding control of AND gates $OA_0$–$OA_{63}$ are not enabled, and the outputs $X_0$–$X_{63}$ for a corresponding set of AND gates remains at a constant level, for example, a "0."

All like column outputs of shift registers of memory 10 are added modulo 2. Accordingly, all like numeral labeled outputs $X_0$–$X_{63}$ of the AND gates are fed to a like numerically designated exclusively OR gate of the set of exclusively OR gates 30. Thus, exclusively OR gates 30 are column oriented as to the matrix M of binary bits stored in memory 10. The resultant column oriented outputs of XOR (exclusively OR) gates $X_0$–$X_{63}$ are aplied in a like numbered order to the set terminals of stage locations $OS_0$–$OS_{63}$ of output shift register 32, and in this manner, shift register 32 is loaded in parallel by these outputs. Thus, there would appear a like numbered order of binary states in shift register 32, and these represent, and are an encryption of, like numbered states of input shift register 18. The now encrypted binary states are read out in serial form by simply applying, from clock signal generator 34, clock pulses to the shift input of shift register 32, whereby they will appear serially as encrypted binary data 36.

Figure 2:
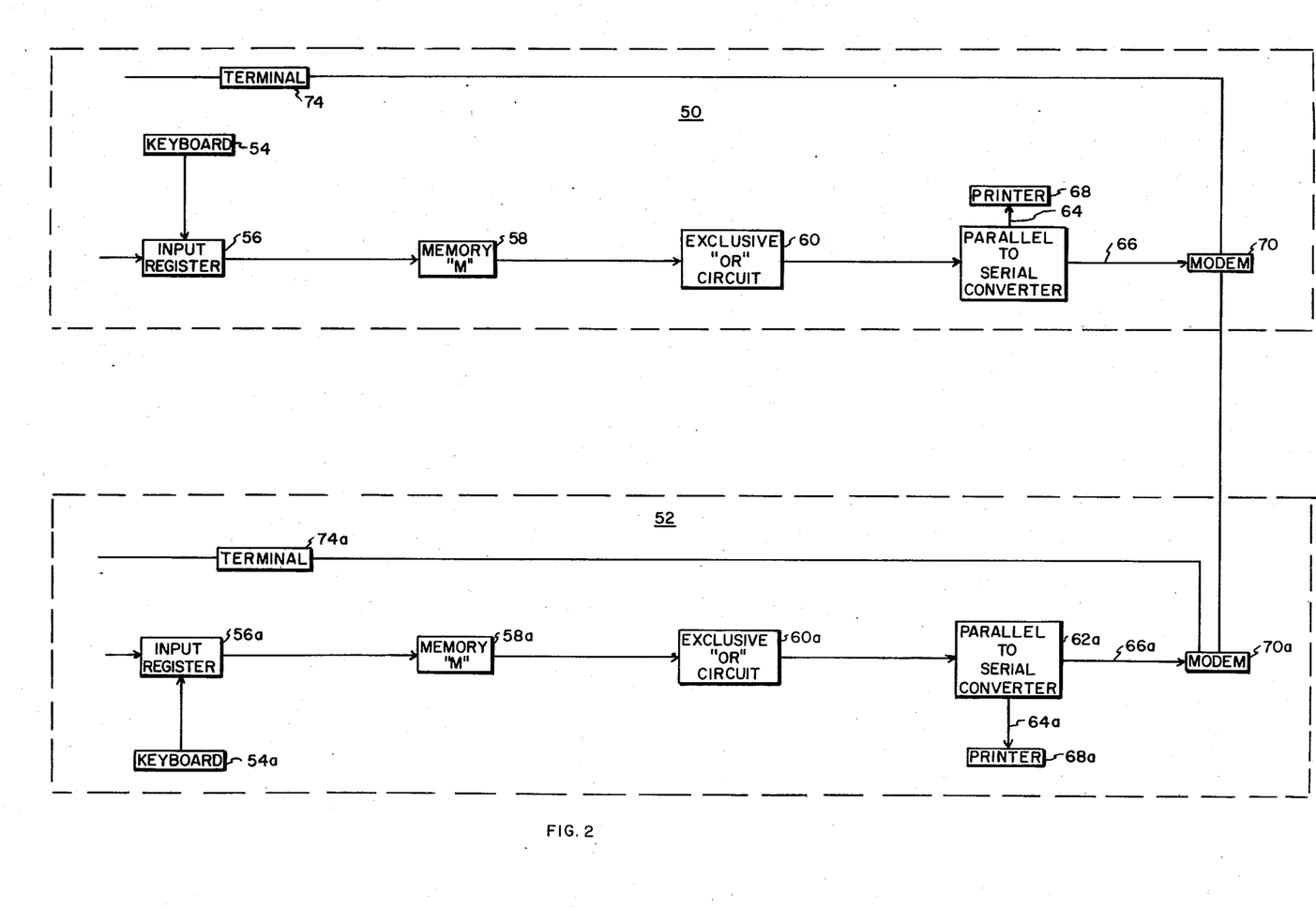
FIG. 2 is a schematic block diagram of a transmission system employing the invention.

FIG. 2 illustrates a two-way communications system in which binary data is transmitted between two communications stations 50 and 52, and wherein the encryption system illustrated in FIG. 1 is employed at both stations. Significantly, a single unit embodying the invention functions to both encode a message to be sent and to decode a message received, with the significant advantage that data is uniquely encrypted in each direction, thus halving the value of any surreptitious intercepts. As an example, the data to be processed is illustrated as having been generated by a keyboard at each station, and by the term keyboard, it is meant a device having a typewriter-like keyboard which provides binary encoded electrical outputs of alpha-numeric characters. Thus, considering station 50, a keyboard 54 furnishes binary bits reflecting letters and/or numbers, and these binary bits are supplied to input shift register 56 serially in sets as described for the loading of input shift register 18 of FIG. 1. While not particularly shown in FIG. 2, keyboard 54 would include appropriate circuitry such as illustrated by buffer memory 22 and clock 24 of FIG. 1 to appropriately interface keyboard 54 with input register 56. The essential thing is that the binary data generated by keyboard 54 is read into input register 56 in like numbered bit sets to the capacity of input register 56, in this case, 64 bit sets.

Assuming a conventional eight-bit-per-character binary encoding by keyboard 54 is used, this would mean that input register 56 would process out eight binary encoded characters (numbers or letters) per operation. In each operation, the 64 binary bits in input register 56 would, as described with respect to FIG. 1, gate out discrete bits stored in memory 58a which, as described with respect to FIG. 1, contains a matrix M of binary bits. The gating operation is as has been described wherein certain column oriented binary bits from memory 58a are processed and provided as an output through exclusively OR circuit 60, operating in a manner described for exclusively OR circuit 30 of FIG. 1. The modulo 2 outputs are thus provided in a parallel fashion to parallel-to-serial converter 62 which, operating as described for output shift register 32 of FIG. 1 (one example of a parallel-to-serial converter), provides as an output, on output leads 64 and 66, an encrypted version of the binary bits supplied to input register 56 from keyboard 54. Lead 64 couples the output to a standard computer-type printer 68, which is adapted to print out alpha-numeric characters on the same binary bit basis as produced by keyboard 54. Printer 68 is normally inoperative during the described encryption mode of operation for station 50, it normally being employed when a message is being received by station 50 and a message, as will be described, is being decrypted.

Lead 66 feeds the output of parallel-to-serial converter 62 to modem 70, which converts between the "0"–"1" electrical value of binary data and telephone line compatible signals for transmission, typically providing one tone frequency signal for a "0" and another tone frequency signal for a "1." Modem 70 then supplies the thus converted signals to telephone line 72, which transmits the signals to a like modem 70a at station 52. Modem 70a then conventionally converts the tone signals back to conventional "0" and "1" amplitude voltage signals and supplies the same to a computer terminal 74a. Computer terminal 74a, having a counterpart at station 50, includes an appropriate buffer memory and clock arrangement, as described above with respect to buffer memory 22 and clock 24 (FIG. 1), as needed to load the data received from station 50, in 64 bit sets, to input register 56a in a manner as described above for loading from keyboard 54 of station 50 into input register 56. Thus, input register 56a would receive and process binary bits in the same manner as described for input register 18 of FIG. 1. In this case, of course, instead of the 64 binary bits being a direct encryption of keyboard input, as described with respect to station 50, the 64 bit sets are encrypted versions of the 64 bit sets of data derived from keyboard 54 of station 50.

As a feature of this invention, decryption of the encrypted data is effected in the same electrical fashion as described for encryption, but the decryption key of memory 58b is a matrix conforming to the inverse of matrix M of memory 58a of station 50 and is designated $M^{-1}$. Decryption follows the same process as encryption and where selected outputs of memory 58b are fed through an exclusively OR circuit 60a, like that of exclusive OR circuit 30 of FIG. 1 and 60 of FIG. 2.

The output of exclusive OR circuit 60a is converted from parallel-to-serial form by parallel-to-serial converter 62a, a device like that of parallel-to-serial converter 62 of station 50. The output of parallel-to-serial converter 62a is the decrypted version of the encrypted output of station 50, and therefore a recreation of the binary encoded data originally generated by keyboard 54 of station 56.

In order to provide a readout of the decrypted text, an output of parallel-to-serial converter 62a is fed on lead 64a to printer 68a, a device like printer 68 of station 50, and printer 68a prints out the text of the original message.

Where a message is to be originated at station 52, keyboard 54a, like that of keyboard 54 of station 50, is employed to provide binary encoded sets of binary data to input register 56a, and input register 56a interrogates memory 58b to encrypt binary data in terms of the matrix $M^{-1}$ and to supply it via exclusive OR circuit 60a to parallel-to-serial converter 62a. From it, it is fed via modem 70a, telephone line 72, and modem 70a to input terminal 74, and as described for terminal 74a, the received data is sequentially fed in sets of binary bits to input register 56. In this case, the matrix M stored in memory 58a performs a decryption function inasmuch as matrix M, reciprocally, is the inverse of matrix $M^{-1}$ of memory 58b. From this point on, the output of memory 58a is processed through exclusive OR circuit 60 in the manner previously described and is fed through parallel-to-serial converter 62 to printer 68, which prints out the original message from keyboard 54a of station 52 in clear or plaintext.

From the foregoing, it is to be appreciated that the present invention provides a simple but most efficient system of encrypting and decrypting sets of binary data bits. The number of electrical operations needed to effect encryption and decryption is reduced to a point where operation is extremely fast, yet at the same time the security of the system is vastly improved over currently known block or polygraphic systems. For example, the current government and industry block encryption standard (DES) provides for only $2^{56}$ keys, whereas, with the 64×64 matrix described herein (which can be readily increased to a 128×128 matrix), the number of possible keys increases to $2^{2,096}$. The circuitry elements, basic logic elements, are cheap and reliable, and component count is quite low. With a low cost of fabrication, the present system can be afforded by a much increased number of users. Significantly, it is particularly applicable to the burgeoning field of electronic transferance of funds between banks. Typically, such transfers must be handled very fast in view of costly computer time involved and, of course, must be absolutely secure, as large sums of money are often involved.

The system shown in FIG. 2 is particularly adapted to a system where either there is a single station and a single station 2 which communicate regularly, or where there is a single station 50 and a group of stations 52. For those instances where any station must communicate with any other station, then each station would employ both a memory M, designated 58a, and a memory $M^{-1}$, designated 58b. Then, switches would be employed whereby, for transmission, one of these memories would be employed, and for reception, the other would be employed.

Figure 3:
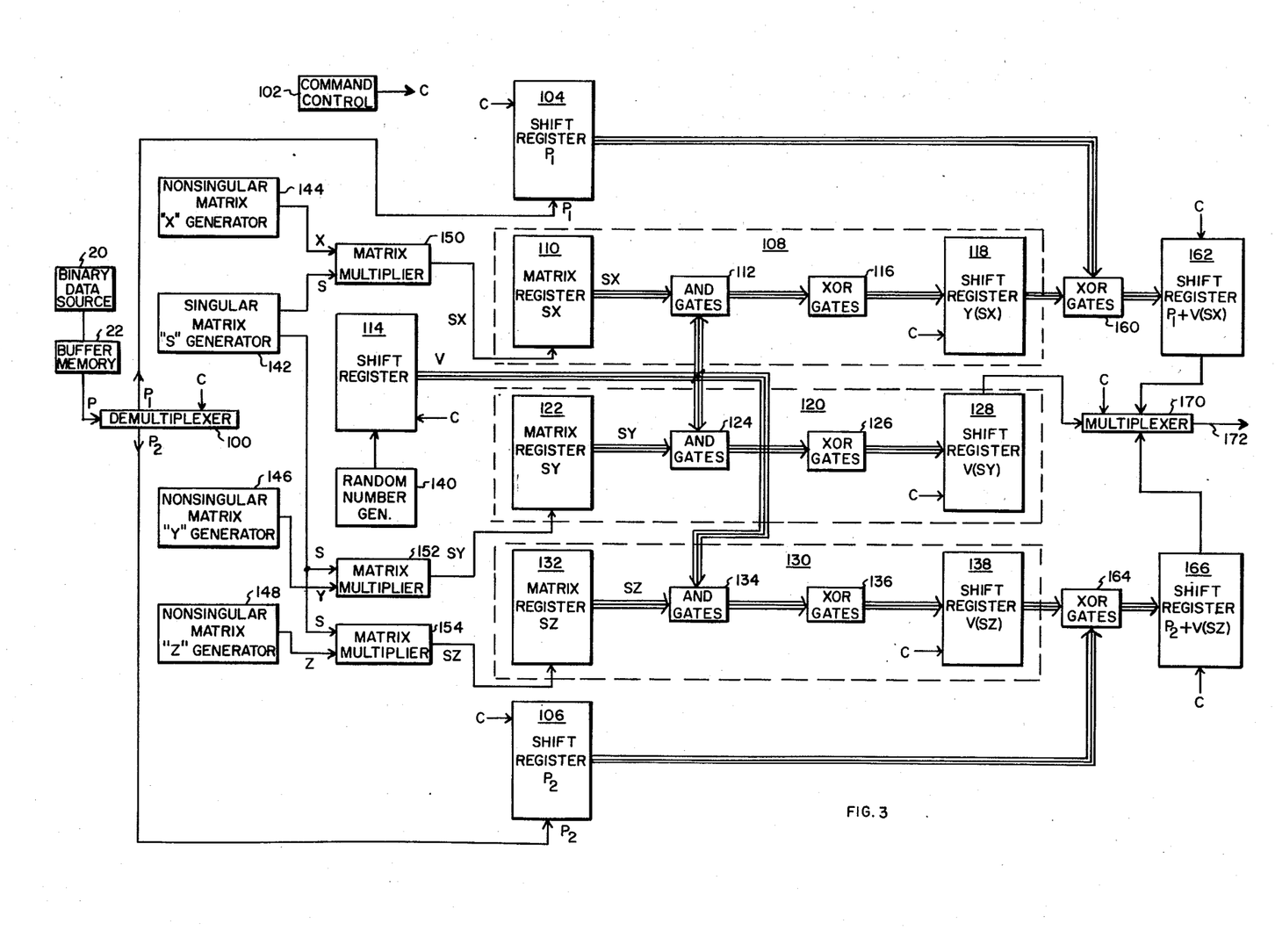
FIG. 3 is an electrical block diagram of a public key encryption system as contemplated by the applicant's invention.
Figure 4:
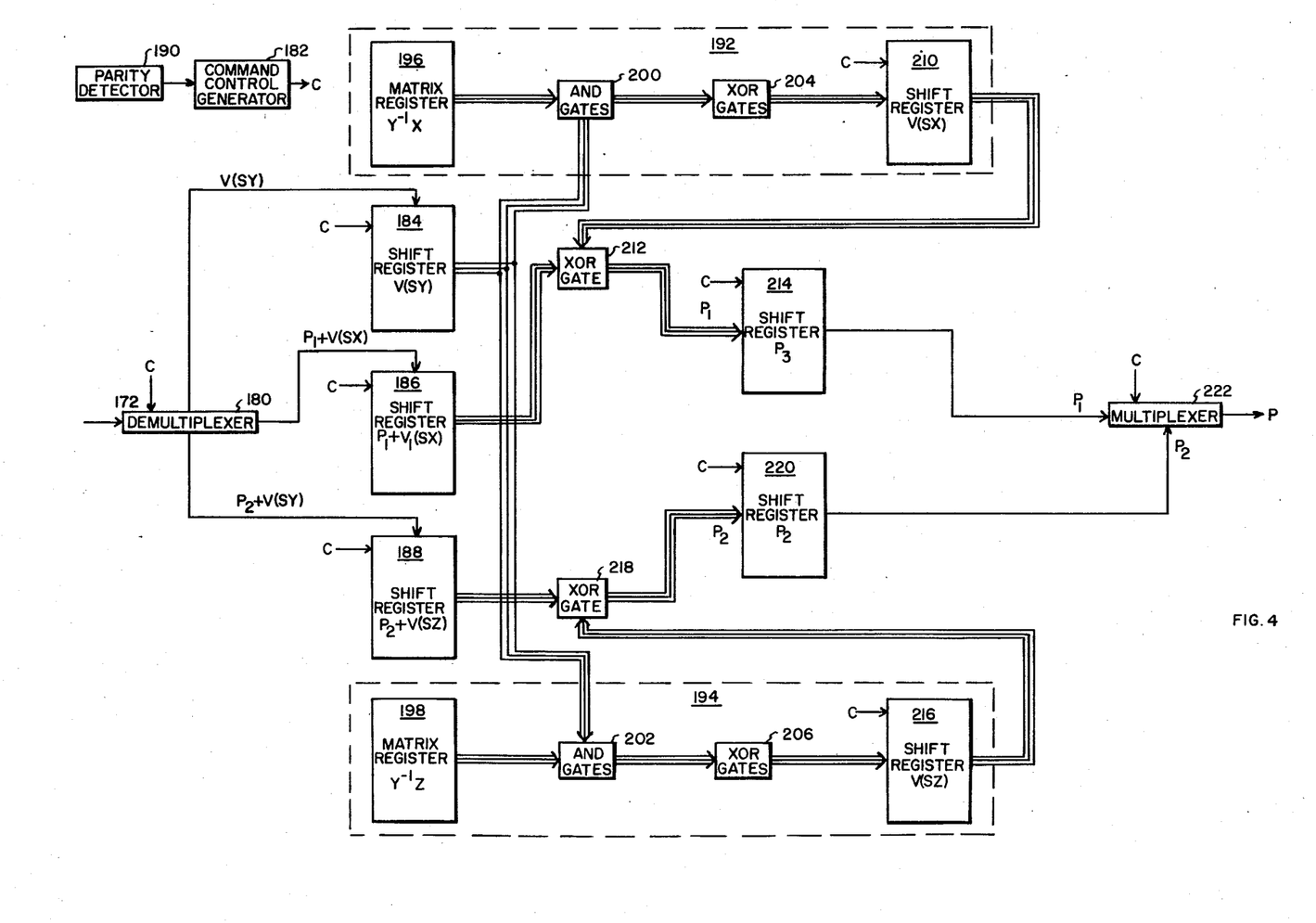
FIG. 4 is an electrical block diagram of a companion privatekey decryption system to that of the encryption system shown in FIG. 3.

FIGS. 3 and 4 together illustrate a basically public-key system for the encryption and decryption of digital data, one wherein the data is encrypted by a publicly known key but may be decrypted only by a privately known key. This employs the same data transformation system shown in FIG. 1, namely, the combination illustrated by memory 10, AND gates $OA_0$–$OA_{63}$, XOR gates $X_0$–$X_{63}$, and shift register 32. Such a combination is hereinafter referred to as a cryptor. There is one more cryptor than the number of data sequences to be encrypted each cycle. In the example, two data sequences are employed, and there are three cryptors.

Referring first to FIG. 3, there would typically be a binary data source 20, as shown in FIG. 1, and it would be fed to a buffer memory 22 from which it would be clocked out to a demultiplexer 100 in 64 bit groups under the control of command control 102 which would, in a conventional manner, provide command signals C to all elements of the system. Demultiplexer 100 functions to separate succeeding 64 bit groups, sending one group, as data group P1 to shift register 104 and the other as data group P2 to shift register 106. These shift registers temporarily store data pending encryption. Data groups P1 and P2 may be unrelated data rather than contiguous elements of data stream P.

A first cryptor 108 contains a matrix register 110 in which a singular 64×64 bit binary matrix SX is stored. Its state is gateable by 64 AND gates 112 from a 64 bit group V stored in shift register 114, just as in the case of, and arranged as, gates $OA_0$–$OA_{63}$ shown in FIG. 1, except that V (Vernam or one-time key) represents a random bit group rather than data to be directly encoded. The gated outputs are XORed by XOR gates 116, and their outputs are fed in parallel to shift register 118, just as in the case of XOR gates $X_0$–$X_{63}$ and shift register 32 shown in FIG. 1.

A second cryptor, cryptor 120, includes matrix register 122, it having stored in it singular 64×64 bit matrix SY, and its 4096 states are gateable by AND gates 124 in response to the same binary bit group V stored in shift register 114. The AND gate outputs are fed to XOR gates 126, and their outputs are fed in parallel to shift register 128.

A third cryptor 130 contains matrix register 132 in which is stored singular 64×64 bit matrix SZ, and its outputs are gated by AND gates 134, again, responsive to the binary bit group V stored in shift register 114. The outputs of AND gates 134 are fed to XOR gates 136, and the outputs of the XOR gates are fed in parallel to shift register 138.

Significantly, as stated, the gating or keying signal or signal states V of shift register 114 are a random group, they being obtained from random number generator 140, and shift register 114 is refreshed by a command signal C, being a new random number sequence after a sequence is used once in an encrypting sequence.

As a result of the data transformations described, there is created three 64-bit cryptic signals V(SX), V(SY), and V(SZ).

Before proceeding further, it is important to consider the derivation of the stored matrices SX, SY, and SZ, being the parenthetical portions of these three cryptic signals. Thus, it is to be noted that the S term is a singular matrix, generated, by way of illustration, by singular matrix S generator 142, and X term is a non-singular matrix generated by non-singular matrix X generator 144, the Y term is a non-singular matrix generated by non-singular matrix Y generator 146, and the Z term is a non-singular matrix generated by non-singular matrix Z generator 148. Matrix S is multiplied by the X, Y, and Z matrices in matrix multipliers 150, 152, and 154, respectively, from which the product terms are supplied the matrix registers as shown. In practice, typically the generation and multiplication of the matrices would be accomplished by a single digital computer.

To effect encryption, the P1 data bits in shift register 104 are related in discrete XOR gates 160 to like ordered bits of the V(SX) signals stored in shift register 118. The resultant which is designated in a conventional manner as P1+V(SX), i.e., P1 XORed with V as transformed by SX, is fed from XOR gates 160 in parallel form to shift register 162 for buffer storage. Thus, bit 1 of each shift register is related by one XOR gate, and the resulting output is fed to the bit 1 position of shift register 162.

In a like manner, the P2 data group in shift register 106 is encrypted by an XOR function in XOR gates 164 with like ordered bits of the V(SZ) signal stored in shift register 138. The resultant, designated P2+V(SZ), is fed from XOR gates 164, in parallel to shift register 166 for buffer storage.

In the manner described, there has been effected a transformation or encrypting of a first 64-bit block P1 of the incoming signal P as a function of one discrete singular matrix SX, and a random number V, and a second and succeeding 64-bit block P2 of it has been transformed as a function of the combination of another singular matrix SZ and the same random number. There has also been created a decrypting aid signal V(SY) temporarily stored in shift register 128. Significantly, only one random signal source is employed, this being the case regardless of the number of intelligence data groups (blocks)to be encrypted. There is always one more of the public keys (SX, SY, SZ, etc.) than the number of intelligence groups to be encrypted. Although not shown, V(SY) must be non-zero; otherwise, a new V(SY) must be generated.

Of the cryptor signals generated and combined, all are free to be published or transmitted except for the plaintext and the random noise signal V, and since it is constantly changing, even if a particular 64-bit sequence of it were leaked or otherwise made available, it would not have any effect upon the decrypting of any other than one encrypted group.

The three signal groups P1+V(SX), P2+V(SZ), and V(SY) are each fed to multiplexer 170 which, responsive to an appropriate command signal C, arranges the three signals in a time sequence, sending one after the other, along or within a single communications channel or transmission line 172 to the addressee of the encrypted message. Additionally, by conventional means, a discrete bit group may be added to the regular 64 data bits to identify the beginning and end or a group, if needed.

FIG. 4 illustrates a companion decryupting system employed by an addressee. Thus, the decrypting system is arranged to receive the data bit groups V(SY), P1+V(SX), and P2+V(SZ) on transmission line 172. They are fed to demultiplexer 180, and demultiplexer 180, under the control of command control generator 182, separates the three signal groups, feeding signals V(SY) to shift register 184, P1+V(SX) to shift register 186, and P2+V(SZ) to shift register 188. Command control generator 182 operates responsive to appropriate beginning and end signals to effect the timing of its operation in a conventional manner. As an example, a parity bit detector 190 would detect the position of each data group and thus provide a timing signal in command control generator 182 to enable it to precisely apply control signals C to elements of the system to effect the precise synchronization of shifting data through the system.

The decryption system employs two cryptors 192 and 194 similar to cryptors 108, 120, and 130 shown in FIG. 3. Cryptor 192 contains a matrix register 196 having stored in it a private-key $Y^{-1}X$, this key being a non-singular matrix which is, as designated by the terms, the product of the inverse of non-singular matrix Y and matrix X, which are elements of the public-keys as discussed above. Similarly, cryptor 194 includes matrix register 198, and it houses the private key $Y^{-1}Z$ bearing a like relation to like designated terms employed in the generation of the public-keys. Cryptors 192 and 194 additionally have like AND gates 200 and 202 and XOR gates 204 and 206. The actual generation of the nonsingular matrices $Y^{-1}X$ and $Y^{-1}Z$ is not illustrated, it being understood that they would be conventionally generated and stored in matrix registers 196 and 198. One cryptor is required for each intelligence data group to be decrypted.

Cryptor 192 functions to develop an ultimately decrypting signal V(SX) from V(SY) for the decryption and thus retrieval of each data group P1 from the term P1+V(SX). It does this by reading out matrix $Y^{-1}X$ from matrix register 196 in terms of data group V(SY) in shift register 184. This is accomplished by controlling AND gates 200 by this latter data group as shown and XORing the outputs of AND gates 200 in XOR gates 204 and feeding them in a parallel mode to shift register 210. Thus, there is stored in shift register 210 V(SX), the Y term having been effectively replaced by X.

Decryption then follows by feeding the V(SX) binary group from shift register 210 as one set of inputs to 64 XOR gates 212 and the P1+V(SX) data binary group set to the other inputs. The two terms are thereby related on a like ordered bit-by-bit basis by XOR gates 212, with the result that the V(SX) term is eliminated, leaving as an output of XOR gates 212 the decrypted term P1 which is then fed to, and stored in, shift register 214.

Cryptor 194 functions like cryptor 192 except that it develops signal V(SZ) from V(SY) for decryption and thus retrieval of each data group P2 from the term P2+V(SZ). It does this by reading out matrix $Y^{-1}Z$ from matrix register 198 in terms of data group V(SY) as supplied by shift register 184. This is accomplished by controlling AND gates 202 from the data group V(SY) and XORing the outputs of AND gates 202 in XOR gates 206 and feeding their outputs in a parallel mode to shift register 216. By this process, the term V(SZ) is obtained and stored in shift register 216, and Y term, again, having been effectively replaced by Z.

Recovery of the data group P2 is obtained by feeding the term containing it, P2+V(SZ) from shift register 188 to one set of inputs of XOR gates 218 and feeding the V(SZ) signal to the other set of inputs of the XOR gates. Thus, as in the case of the recovery of P1, the two terms fed to XOR gates 218 are related on a like ordered bit-by-bit basis, with the result that the V(SZ) term is eliminated, leaving as an output only the decrypted term P2, which is then fed to, and stored in, shift register 220. The P1 output of shift register 214 and P2 output of shift register 220 are then fed to a multiplexer 222 which recombines signals P1 and P2 in a time shared manner to provide as an output a sequence wherein P1 and P2 follow in the original order in which they appeared in signal P, representative of the original encrypted text in binary form and applied to demultiplexer 100 of the encrypting system shown in FIG. 3.

While it is to be noted that signals P1 and P2 are parts of a single signal stream simply broken up to be dealt with in sequence, it is to be appreciated that these signal components could be independent messages. A reason for breaking up the message into two parts is that all block encryption systems handle input text in fixed multiples of some given size, e.g., 64-bits, 128-bits, etc. Finally, and most significantly, is the fact that, practically, the applicant's public-key system is undecipherable for two reasons. It presents a new encoding for each data group, and in each data group there is the possibility of $2^{64}$ combinations possible. Even if smaller size data groups, say, 32-bit or even 16-bit groups, the task of identifying the code for any block remains computationally not feasible. Additionally, the private-keys cannot be derived from the public-keys since the public-keys are deliberately and significantly singular.

It is, of course, not enough to simply create an essentially unbreakable code; this, of course, has been accomplished before with one-time key systems. For practical usage on any scale, there are the additional requirements that the encryption be accomplishable in reasonable time without the classic key distribution problem and with reasonable computational speed. For example, in one of the highly touted public-key systems being employed today, the rate of encryption is on the order of less than 500 bits per second. In contrast, the encryption operation outlined herein may be performed at rates equaling or greater than the channel capacity of existing communications systems. As to the complexity and cost of hardware, it is quite obvious from the embodiments shown that it is both simple and inexpensive.

What is claimed is:

1. A communications system comprising:
   buffer storage means for successively, temporarily, storing sets of discrete binary signal states;
   key storage means comprising:
      a memory unit including a plurality of binary signal memory locations, and there being stored therein an invertible binary matrix of ordered rows and columns having a common row and column origin, and
      readout means, including a plurality of row oriented sets of electronic gating means, one set for each row of memory locations, each electronic gating means of a set being coupled to a separate memory location of the same row, and being responsive to a selected state of binary signal control input for gating to an output the binary states of the memory location to which the gate is coupled;
   coupling means for coupling said discrete binary signal states of said buffer storage means as said control inputs to said sets of electronic gates of said electronic gating means whereby, when a said selected signal state is present and coupled to a said electronic gating means, the signal state of a coordinately ordered row of said matrix appears across the outputs of a said set of electronic gating means;
   a set of row oriented exclusively OR logic circuit means, each said logic circuit means being responsive to a column oriented set of outputs of said electronic gating means for providing, in a selected order, an ordered set of modulo 2 character output signals; and
   signal means responsive to successively following sets of discrete binary signal states and thereupon sets of said ordered set of modulo 2 character output signals for providing said last-named output signals as a series of sets of binary output signals;

whereby sets of said ordered series of binary signal states are translated, en masse, into encrypted sets of binary state output signals.

2. A communications system comprising:

first and second communications stations;

communications signal transmission means for the transmission of first signals from said first station to said second station and for transmission of said second signals from said second station to said first station;

said first and second stations each comprising:

buffer storage means having a selected plurality of ordered binary storage locations, and responsive to a series of binary state input signals for selectively and temporarily storing, in order of appearance, successive sets of said series of input signals in correspondingly ordered storage locations, key storage means comprising:

a plurality of binary signal memory locations, and there being stored therein an invertible binary matrix of ordered rows and columns having a common row and column origin, and readout means including a plurality of row oriented sets of electronic gating means, one set for each row of memory locations, each electronic gating means of a set being coupled to a separate memory location of the same row, and being responsive to a selected state of binary signal control input, for gating to an output the binary state of the memory location to which the gate is coupled, coupling means for supplying the signal state of each discretely ordered storage location of said buffer storage means, as a control input, to a row oriented discrete set of electronic gating means for a said row of said matrix, whereby, where said selected signal state is present in one of said ordered storage locations of said buffer storage means, the signals states of a coordinately ordered row of said matrix appears across outputs of a said set of electronic gating means;

a set of row oriented exclusively OR logic circuit means, each said logic circuit means being responsive to a column oriented set of outputs of said electronic gating means for providing, in a selected order, an ordered set of modulo 2 character output signals, and signal means responsive to successively following said ordered set of modulo 2 character output signals for providing said last-named output signals as a series of sets of binary output signals to said communication means; and said invertible matrix of said key storage means of said first station is the inverse of said invertible matrix of said key storage means of said second station.

3. A public-key polygraphic encryption, system with one-time key capability comprising:

first buffer memory means having a selected plurality of binary storage locations, and responsive to a series of randomly generated and selected binary state input signals V for selectively and temporarily storing at least one set of said series of selected input signals in ordered storage locations;

first and second storage means, each including a plurality of binary signal state signal storage locations, there being stored in the storage locations of said first storage means a singular binary matrix SX and in said second storage means a singular matrix SY, each being in ordered rows and columns and having a common row and column origin, and wherein the matrices are the products of multiplications of singular matrix S by non-singular matrices X and Y;

first gating means, including a plurality of row oriented sets of first electronic gating means, one set for each row of storage locations of said first storage means, each electronic gating means of a set being coupled to a separate storage location of a row, and each row being responsive to a selected state of a random binary signal V stored in said first buffer storage means for gating to first outputs the binary state of the storage location to which said gating means is coupled;

second gating means, including a plurality of row oriented sets of second electronic gating means, one set for each row of storage locations of said second storage means, each electronic gating means of a last-named set being coupled to a separate storage location of the same row, and each row being responsive to a selected state of a random binary signal V in said buffer storage means, for gating to a second output the binary state of the storage location to which said last-named gating means is coupled;

a first set of row oriented exclusively OR logic circuit means, each said logic circuit means being responsive to a column oriented set of outputs of said first electronic gating means for providing, in a selected order, a first ordered set of modulo two character first output signals as a compilation of the column states of the columns of said matrix stored in said first storage means as transformed by the signal content of said first buffer memory means;

a second set of row oriented exclusively OR logic circuit means, each said logic circuit means being responsive to a column oriented set of outputs of said second electronic gating means for providing, in a selected order, a second ordered set of modulo two character output signals as a compilation of the column states of the columns of said matrix stored in said second storage means as transformed by the signal content of said first buffer memory means;

signal coupling means responsive to successively following sets of said second ordered set of modulo 2 output signals from said second row oriented exclusively OR logic circuit means for providing said last-named output signals as a series of sets of binary output signals as decoding signal outputs V(SY);

second buffer memory means having a selected plurality of ordered binary storage locations for selectively and temporarily storing a series of binary state input signals P to be encrypted; and a third set of exclusively OR logic circuit means, each said last-named logic circuit means being responsive to a discrete ordered bit set V(SX) from said first set of row oriented exclusively ordered logic circuit means and said second buffer storage means for providing as an output a series of binary signal outputs as an encrypted version P1+V(SX) of said binary state input signals P1.

4. A system as set forth in claim 3 wherein said system further comprises receiving means for receiving said signals V(SY) and P1+V(SX) and includes:

third buffer memory means having a selected plurality of ordered binary storage locations for selectively and temporarily storing, in order of appearance, sets of said signals V(SY) in said ordered storage locations;

fourth buffer memory means having a selected plurality of ordered binary memory locations for selectively and temporarily storing, in order of appearance, sets of said signals P1+V(SX) in ordered storage locations;

third storage means including a plurality of binary signal state memory locations, there being stored therein a nonsingular binary matrix of $Y^{-1}X$ in terms of ordered rows and columns having a common row and column origin;

third gating means including a plurality of row oriented sets of third electronic gating means, one set for each row of storage locations of said third storage means, each lastnamed electronic gating means of a set being coupled to a separate storage location in the same row, it being responsive to a selected state of binary signal V(SY) stored in said third buffer memory means for gating to a third output the binary state of the storage location to which a gating means is coupled;

a fourth set of row oriented exclusively OR logic circuit means, each said last-named logic circuit means being responsive to a column oriented set of outputs of said third gating means for providing, in a selected order, an ordered set of modulo two character fourth output signals; and a fifth set of exclusively OR logic circuit means, each said logic circuit means being responsive to like ordered bits from said signals P1+V(SX) and V(SX) for providing a series of logical outputs, which outputs are a representation of said signals P1.

5. A system as set forth in claim 4 including:

multiplexing means having as a first input said signal P1+V(SX) and as a second input V(SY) for providing as an output signals P1+V(SX) and V(SY) in an alternating sequence as an output to be transmitted to a receiving location; and said receiving means includes demultiplexing means responsive to serially received said signals V(SY) and P1+V(SX) for routing these signals, separately, to said third buffer memory means and fourth buffer memory means, respectively.

6. A system as set forth in claim 5 further comprising:

fifth buffer storage means having a selected plurality of ordered binary storage locations for selectively and temporarily storing a series of binary state input signals P2 to be encrypted;

a fourth set of exclusively OR logic circuit means, each said last-named logic circuit means being responsive to a discrete ordered bit of signals V(SZ) and said signals P2 from said fifth buffer storage means for providing as an output a series of binary signal outputs as an encrypted version P2+V(SZ) of said binary state signals P2;

said receiving means includes means for receiving signals V(SY), P1+V(SX) and P2+V(SZ) and further includes sixth buffer storage means having a selected plurality of ordered binary memory locations for selectively and temporarily storing, in order of appearance, sets of said signal P2+V(SZ);

fourth storage means including a plurality of binary signal state memory locations, there being stored therein a non-singular binary matrix of $Y^{-1}Z$ in terms of ordered rows and columns having a common row and column origin;

fourth gating means including a plurality of row oriented sets of fourth electronic gating means, one set for each row or storage location, each last-named electronic gating means of a set being coupled to a separate storage location in the same row, it being responsive to a selected state of binary V(SY) signals signals stored in said third buffer memory means for gating to a fourth output, the binary state of the storage location to which a gating means is coupled; and a sixth set of exclusively OR logic circuit means, each last-named last logic circuit means being responsive to like ordered bits from said signals P2+V(SZ) and V(SZ) for providing a series of logic outputs, which outputs are representative of said signals P2.

7. A system as set forth in claim 6 further comprising:

demultiplexer means responsive to a sequential binary string of data P for alternately separating bits into said quantities P1 and P2, data strings, and said data string P1 being fed to said second buffer memory means and said data stream P2 being fed to said fifth buffer memory means; and said receiving means including multiplexer means responsive to said data signals P1 and P2 for reestablishing and providing as output signals P as a said data string.

* * * * *